Jan. 4, 1955 A. L. ROBERTSON 2,698,536
FOAM RUBBER FORM FOR USE IN LAYING MASONRY WALLS
Filed Oct. 10, 1952 3 Sheets-Sheet 1
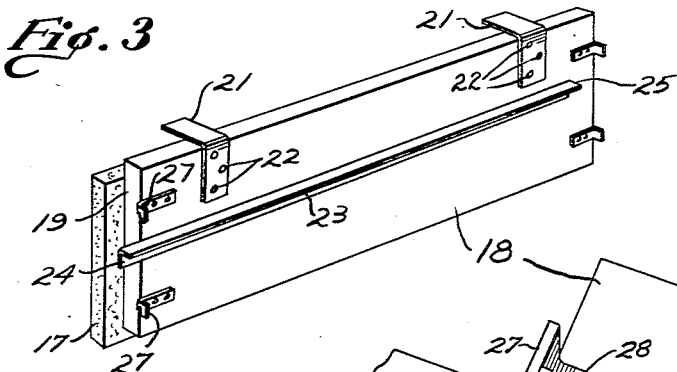
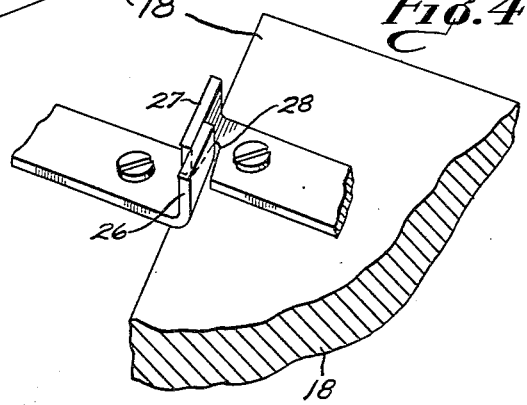
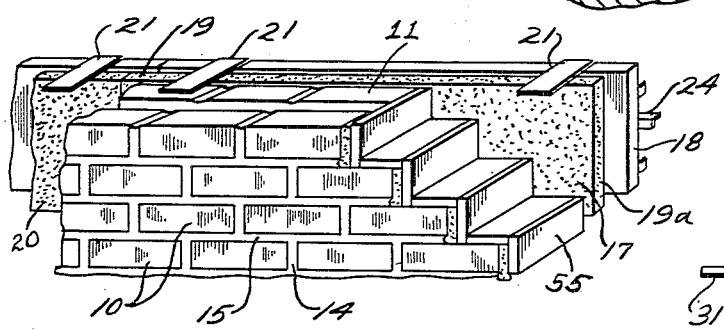
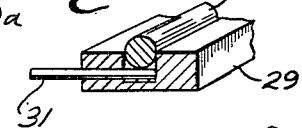
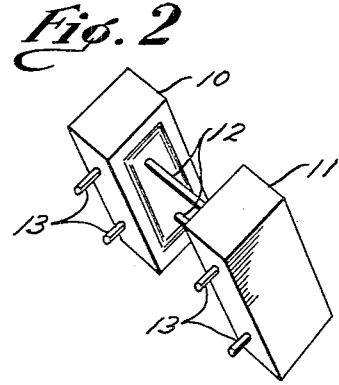
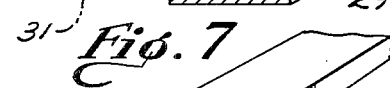
INVENTOR.
ALAN L. ROBERTSON
BY
H. G. Manning
ATTORNEY Jan. 4, 1955 A. L. ROBERTSON 2,698,536
FOAM RUBBER FORM FOR USE IN LAYING MASONRY WALLS
Filed Oct. 10, 1952 3 Sheets-Sheet 2
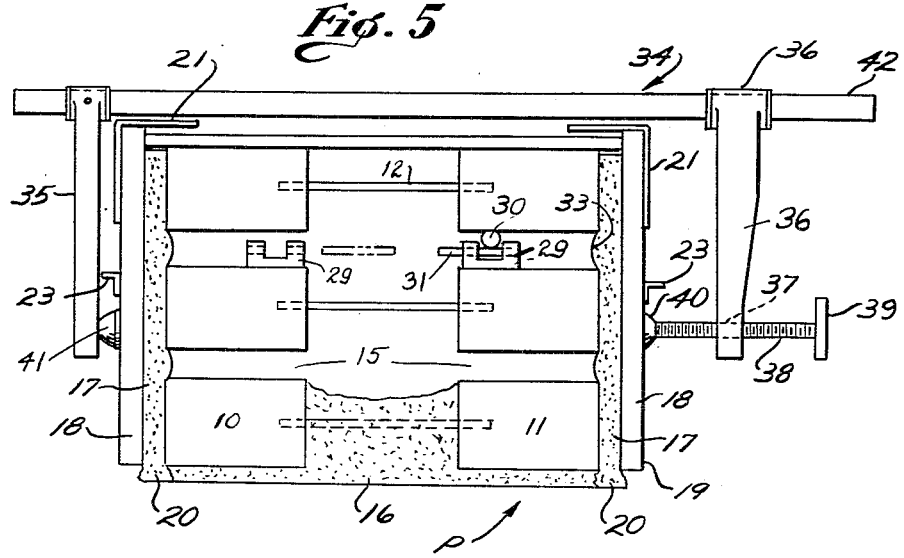
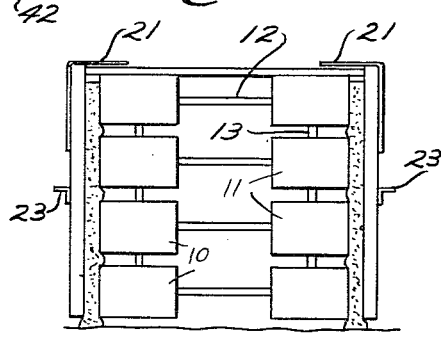
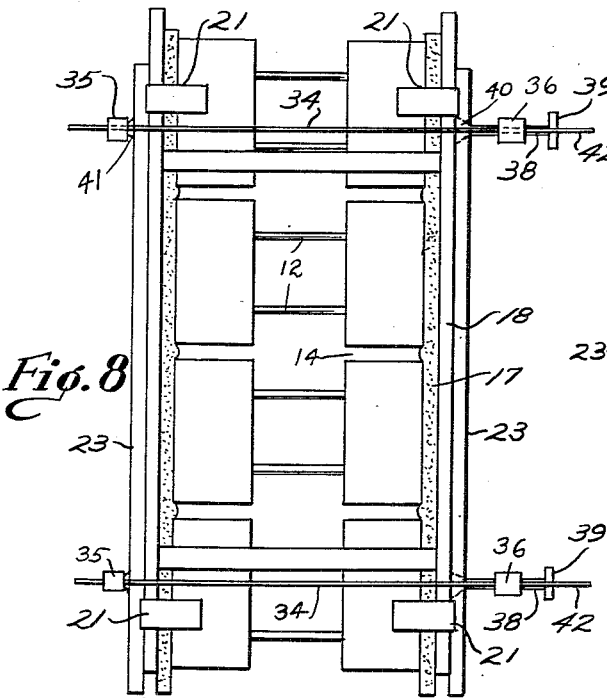
INVENTOR.
ALAN L. ROBERTSON
BY H. G. Manning
ATTORNEY Jan. 4, 1955 A. L. ROBERTSON 2,698,536
FOAM RUBBER FORM FOR USE IN LAYING MASONRY WALLS
Filed Oct. 10, 1952 3 Sheets-Sheet 3
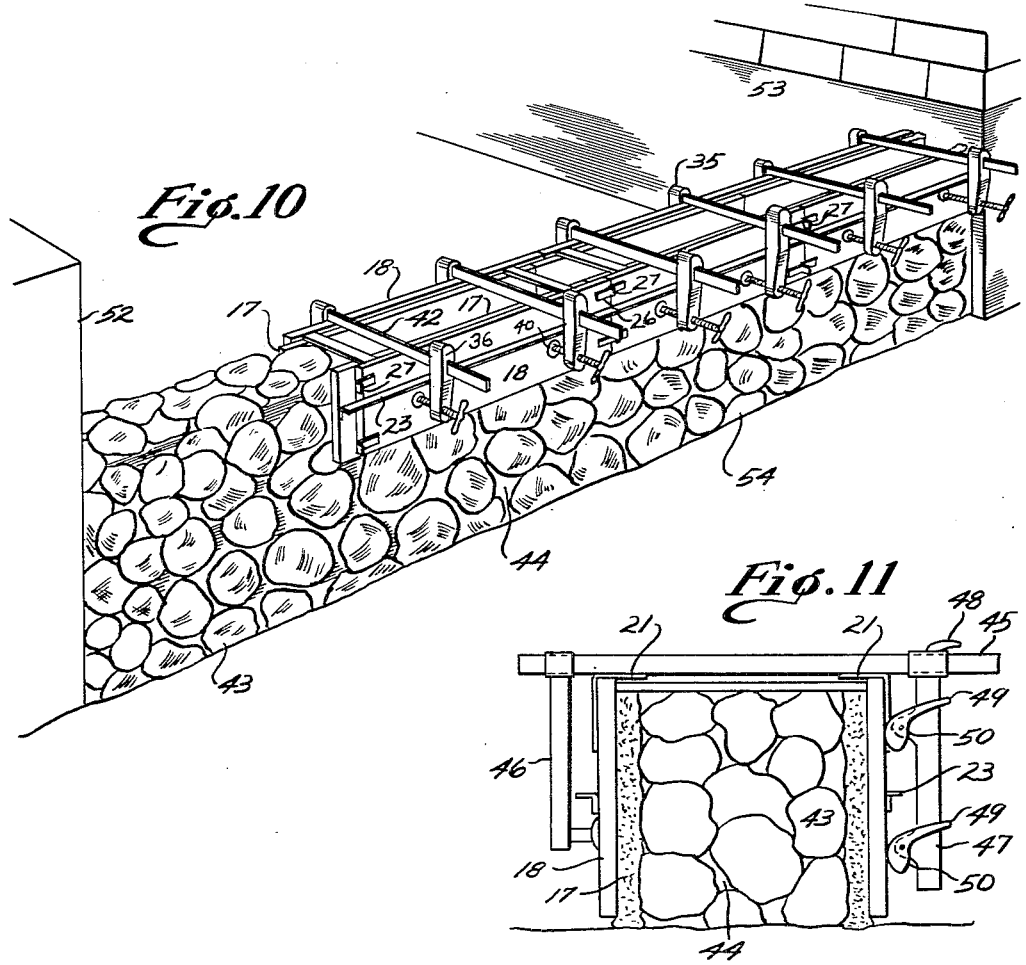
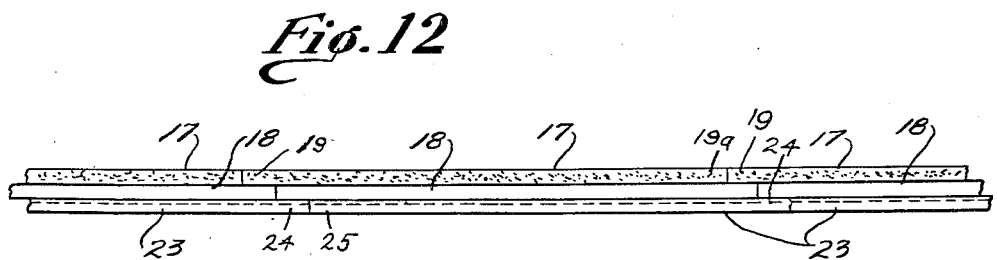
INVENTOR.
ALAN L. ROBERTSON
BY H. G. Manning
ATTORNEY

United States Patent Office 2,698,536
Patented Jan. 4, 1955

2,698,536

FOAM RUBBER FORM FOR USE IN LAYING MASONRY WALLS

Alan L. Robertson, New Britain, Conn.

Application October 10, 1952, Serial No. 314,025

7 Claims. (Cl. 72—129)

This invention relates to building constructions, and more particularly to a foam rubber form for use in molding grout in the laying of masonry walls.

One object of this invention is to provide a jig for spacing apart the bricks or other building units to insure uniform joints therebetween and uniform thickness in the walls.

A further object is to provide a building construction form of the above nature having side outer panel members connected with inner foam rubber pads which embrace the bricks or other building units located therebetween.

A further object is to provide a jig of the above nature in which the panels are provided with upper hangers for supporting the foam strips from the top of the wall.

A further object is to provide a form of the above nature employing a pair of foam rubber pads which will insure formation of full concave joints between the bricks, will prevent the leakage of grout, and will keep the outside of the bricks clean, thus automatically tooling up the joints without the use of a trowel or other implement.

A further object is to provide interlocking means for connecting the adjacent pad-supporting panels together in operating position.

A further object is to provide a plurality of clamps for pressing the panels inwardly to keep the foam rubber strips in proper contact with the interior building units.

A further object is to provide a U-shaped preliminary spacer member for separating the horizontal layer of bricks from the underlying layer previously laid, which spacer member is thereafter removed by pulling it out endwise after the panels have been clamped in position before pouring the grout into the mold.

A further object is to provide a pair of panels for supporting foam pads of the above nature in which the ends and bottom of said panels and pads overlap the adjacent panels and pads.

A further object is to provide a system of laying masonry walls in which it is not necessary to employ lime in the grout, with the result that a wall of greatly increased lateral and compressive strength may be produced.

A further object is to provide a device of the above nature which will be simple in construction, inexpensive to manufacture, easy to install and manipulate, compact, ornamental in appearance, labor and time-saving, and very efficient and durable in use.

With these and other objects in view, there have been illustrated on the accompanying drawings several forms in which the invention may conveniently be embodied in practice.

In the drawings,

Fig. 1 represents a perspective view of a section of a finished brick wall showing a foam rubber pad and a supporting panel in operating position on one side of said wall.

Fig. 2 is a perspective view of one of the duplex brick units employed in building the masonry wall of Fig. 1, showing horizontal spacing dowel pins between the bricks and vertical spacing dowel pins under said bricks.

Fig. 3 is a perspective view of one of the foam rubber pads and the outer supporting panel connected therewith, and also showing a side angle brace and a pair of top angle members mounted on said panel.

Fig. 4 is a perspective view on a larger scale of the interlocking hook and socket members for connecting the adjacent supporting panels together.

Fig. 5 is a view of the masonry laying form showing two layers of duplex brick units clamped between the foam rubber pads preparatory to pouring the grout, and also showing the pair of removable U-shaped preliminary spacer members under the layer of bricks being laid, said spacers being supported by the wall previously laid.

Fig. 6 is a sectional perspective view of one of the removable U-shaped spacer members shown in Fig. 5 with the removable longitudinal pin in its initial elevated position.

Fig. 7 is a similar sectional perspective view of the same, with the base cross pin pulled out and the longitudinal pin dropped down prior to pulling out the U-shaped spacer before pouring the grout.

Fig. 7a is a perspective sectional view of a modified form of the horizontal spacing member of rectangular shape.

Fig. 8 is a top plan view of the masonry form shown in Fig. 5 prior to the pouring of the grout.

Fig. 9 is an end view on a smaller scale of the masonry laying form illustrated in Fig. 5, showing the horizontal and vertical dowel pins located in sockets in the bricks to space said bricks apart and provide uniform grout joints therebetween.

Fig. 10 is a perspective view of the improved masonry laying form as it appears when used to produce a stone wall, and showing a modified form of top cross brace member for spacing apart the foam rubber pad-supporting panels.

Fig. 11 is an end view of the same prior to pouring the grout, and showing a modified form of toggle lever clamping members.

Fig. 12 is a top view of one side of a masonry laying form showing how the joints between the separate sections of the foam rubber pads and supporting panels are offset, and interlocked by means of side angle braces.

The invention consists generally of a jig or form for spacing and holding two rows of bricks or other building units prior to the pouring of the grout between said rows.

The invention also includes a pair of porous sealing foam rubber pads located outside of the rows of bricks for pressing inwardly thereupon so as to produce uniform full concave grout joints between said bricks and to avoid injury to said bricks. These sealing pads also act as a filter and prevent the escape of the grout from said joints and thus avoid the necessity of cleaning the wall after it has been poured. The foam rubber pads are held in place by means of a pair of angle-shaped hanger strips secured to the outer panels, and said panels are pressed inwardly upon the brick units by means of deep engagement U-shaped clamps.

Provision is also made in the first form of the invention herein disclosed of vertical spacing dowel pins which are seated in sockets in the lower surfaces of the bricks, and horizontal spacing dowel pins seated in sockets in the sides of said bricks.

A duplex brick building unit which may be used in laying such a masonry wall was fully described in my prior copending application, S. N. 197,078, filed November 23, 1950, entitled Multiple Brick Building Unit.

Referring now to the drawings, in which like reference numerals denote corresponding parts throughout the several views, the numerals 10 and 11 indicate a plurality of rows of bricks having horizontal spacing dowel pins 12 separating said bricks apart uniformly, and a plurality of vertical spacing dowel pins 13 under said bricks. The dowel pins 12 and 13 are frictionally fitted in sockets in the respective outer faces of said bricks. By means of this construction, uniform vertical spaces 14 and horizontal spaces 15 are provided between the adjacent bricks of the layers which are to be laid in the masonry wall. In accordance with the customary practice, such spaces are to be filled with grout 16 consisting of a mixture of cement, water, and crushed stone, or other solid material.

In order to obtain a full grout joint automatically pointed up, and to allow the removal of the temporary horizontal joint spacers before the pouring of the grout, provision is made of a pair of rectangular foam rubber pads 17 which are secured to and supported by outer rectangular panels 18.

As clearly shown in Figs. 1 and 12, the pads 17 are preferably offset endwise from the panels 18, so as to provide an overlapping section 19 on one end and an underlying section 19a on the other end. Moreover the bottom of the pad 17 is provided with a depending section 20 so that adjacent sections of the pads 17 and panels 18 will be interfitted together.

The pads 17 and panels 18 are adapted to be supported on the top of the building units such as the duplex bricks, (shown in Figs. 1 and 2) by means of a pair of angle members 21 secured as by screws 22 to the panels 18.

In order to brace adjacent panels 18 in longitudinal alignment with each other, provision is made of horizontal elongated brace members 23, having ends 24 extending beyond the panels 18, and ends 25 terminating inside said panels, as clearly shown in Figs. 1 and 3 of the drawing.

In order to securely lock the adjacent panels detachably together, provision is made of interlocking angle hooks 26 and angle sockets 27 (Fig. 4), the latter being provided with vertical slots 28 into which the hooks 26 are detachably secured.

In order to temporarily space the layers of bricks, or other building units being laid, from the underlying previously laid wall section, provision is made of elongated U-shaped spacer members 29, as clearly shown in Figs. 6 and 7, said spacer members being provided with horizontal elongated rods 30 located longitudinally in the central recess of said spacer member. The spacer members 29 are alternative to the vertical dowel pins 13. Provision is also made of a plurality of smaller cross pins 31 located beneath the rod 30 and adapted to be removed whenever it is desired to extract the spacer members 29 after the pads and panels have been locked in position prior to pouring the grout, as shown in Figs. 5, 8, and 9. If desired, a modified removable temporary spacer member 32 of rectangular shape may be used instead of the U-shaped member 29 (see Fig. 7a).

It will be understood by the use of the present invention, that the joints 33 between the adjacent bricks 10, 11, will be made concave without the necessity of the use of trowels or any other tools by the bricklayer.

In order to secure the pads in resilient engagement with the layers of bricks within the building units, provision is made of deep engagement U-shaped clamps 34 (Fig. 5), having a horizontal cross member 42 from which depends a fixed vertical arm 35 and an adjustable movable vertical arm 36. The movable arm 36 is provided with a tapped hole 37 at the lower end thereof, in which is mounted a horizontal screw 38 which may be turned manually by means of a handle 39 on the other end thereof.

The screw 38 is provided on its inner end with a swivel plate 40 pressing on one of the panels 18, while the opposite panel 18 is engaged by a shoe 41 secured to the fixed arm 35.

In case it is desired to mold a stone masonry wall, the spaces between the pads 17 will be filled with loose stones 43 whereby after the grout has been poured irregular joints 44 between said stones will be formed (see Fig. 10).

In the modified form of clamp shown in Fig. 11, provision is made of a top pipe 45, upon which a vertical arm 46 is fixed at one end and a vertical arm 47 is movably mounted on the other end thereof. In order to secure the movable arm 47 in adjusted locked position, a top locking clamp 48 is provided thereon. Provision is also made on the movable arm 47 of a pair of ears 50, for receiving toggle levers 49, secured by pivot pins 51 to said ears 50.

In Fig. 10, the numerals 52, 53, 54 indicate the previously laid wall sections which form no part of the present invention. A stepped metallic "back up" member 55 to hold the grout in place in the newly poured wall section is also provided (see Fig. 1).

Operation

In operation, any desired building unit (such as the duplex unit shown in Figs. 2 and 5) will first be placed upon the previously laid section P of the wall, and spaced horizontally and vertically from adjacent units as illustrated. The removable spacer members 29 will first be placed upon the previously laid section of the wall P (Fig. 5). The building units will then be laid upon the removable spacer members 29, and the foam pads 17 and panels 18 placed on the sides of the building units. The clamps 34 will next be fitted upon the outside of the panels 18 to cause the pads 17 to press inwardly upon the building units to form uniform full joints therebetween. After the clamping operation the removable spacer members 29 will be removed, whereupon the brick units will be held in spaced relationship due to the friction between their outside surfaces and the foam rubber pads 17, caused by the pressure created when the deep engagement clamps are tightened.

The grout will then be poured into the mold and will fill the joints between the building units.

One advantage of the present invention is that the grout between the brick units will be automatically tooled up without the use of a trowel or other tool, and will produce full concave joints without leakage of the grout, and keeping the outer surface of the bricks or other building units clean.

A further advantage of this improved masonry wall is that reinforcements of steel or other metal may be laid between the brick units, in both horizontal and vertical directions, in a handy and rapid manner.

It will be understood that if desired a single foam rubber pad and supporting panel may be used for forming the outer section of a wall against a part of a building which has already been built, within the spirit and scope of the present invention.

While there has been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. A form for use in laying a masonry wall comprising a panel, a resilient yieldable pad of soft foam rubber on one face of said panel for contact with a plurality of spaced building units laid up in wall formation prior to the pouring of mortar therebetween, a frame member spaced from the back wall of said panel, and adjustable means between said frame member and said panel to exert an inward pressure on said resilient pad, whereby said pad will bulge inwardly into the joint spaces between the spaced building units to produce concave grooves in the mortar joints.

2. The invention as defined in claim 1, in which the joints between adjacent panels are offset between the joints of the ends of said pads so as to cause the adjacent panels and pads to fit together snugly.

3. In an apparatus for laying a masonry wall, a pair of spaced forms having resilient yieldable pads inwardly thereof and adapted to be placed against the opposite sides of an upstanding aggregate of building units resting by gravity upon a solid foundation, means for exerting inward pressure upon said forms to cause said pads to bulge inwardly into the joint spaces between said building units for producing concave grooves in the grout when the latter is poured between said building units within said pads.

4. The invention as defined in claim 3, in which said pads are supported by exterior panels, and interlocking means are provided for detachably connecting said panels together.

5. The invention as defined in claim 3, in which said pads are supported by exterior panels and said panels are provided with inwardly extending horizontal angle members which are adapted to rest on the top of said building units located between said pads.

6. The invention as defined in claim 3, in which elongated angle braces are provided on the outer surfaces of said forms, said angle braces being shorter than said forms at one end, and longer than said forms at the other end, whereby adjacent forms will interfit.

7. A form for use in laying a masonry wall comprising a rigid frame member, an outer elongated panel, an inner elongated resilient yieldable pad of soft foam rubber secured to said panel, and means on said frame member to press said panel inwardly upon an aggregate of building units and grout for defining one side wall of said aggregate and producing concave joints between said building units.

References Cited in the file of this patent

UNITED STATES PATENTS

| Number | Name | Date |
|---|---|---|
| 726,506 | Capen | Apr. 28, 1903 |
| 752,697 | McCarrel | Feb. 23, 1904 |
| 860,927 | Mann | July 23, 1907 |
| 1,054,635 | Cagnassi | Feb. 25, 1913 |
| 1,058,674 | Kertes | Apr. 8, 1913 |
| 1,742,103 | Sholtes | Dec. 31, 1929 |
| 2,648,974 | Sommers | Aug. 18, 1953 |

FOREIGN PATENTS

| Number | Country | Date |
|---|---|---|
| 930,435 | France | Aug. 11, 1947 |